INVENTOR
ROGER ALBERT BERNARD
BY Paul M. Craig, Jr.
ATTORNEY 3,190,332
FLUID-TIGHT SAFETY DEVICE FOR FILLING, STORING AND EMPTYING FLEXIBLE CONTAINERS
Roger Albert Bernard, Conflans-Ste.-Honorine, France, assignor to Le Joint Francais, Paris, France, a French corporation
Filed Feb. 23, 1962, Ser. No. 175,176
Claims priority, application France, May 9, 1961, 855,070
3 Claims. (Cl. 150—8)

This invention relates to a fluid-tight safety device for the filling, storing and emptying of flexible containers for liquid hydrocarbons or the like. The storing of liquids, such as hydrocarbons or the like, in flexible containers necessitates the use on the walls of such containers of filling and emptying systems, which ensure perfect and permanent fluid-tightness during and after both operations.

The many different devices of this type proposed hitherto either do not fulfill this condition in a permanent manner or constitute expensive solutions.

The present invention proposes to provide an efficient and simple solution to the problem thus posed.

It has as its object a fluid-tight safety device for the filling, storing and emptying of flexible containers for liquid hydrocarbons or the like, characterised in that the peripheral edges of the opening in the wall of the container are held between two side-pieces, which are profiled and are clamped in a fluid-tight manner against the said edges interiorly of the container by a washer exerting a permanent pressure under the action of a wedging counter-washer, the orifice provided for the passage of the liquid in the centre of the device being capable of being obturated by a threaded stopper, which presses an annular sealing packing on to a stepped portion of the orifice.

One preferred embodiment of such a device will now be described with reference to the accompanying drawings, in which.

Figure 1:
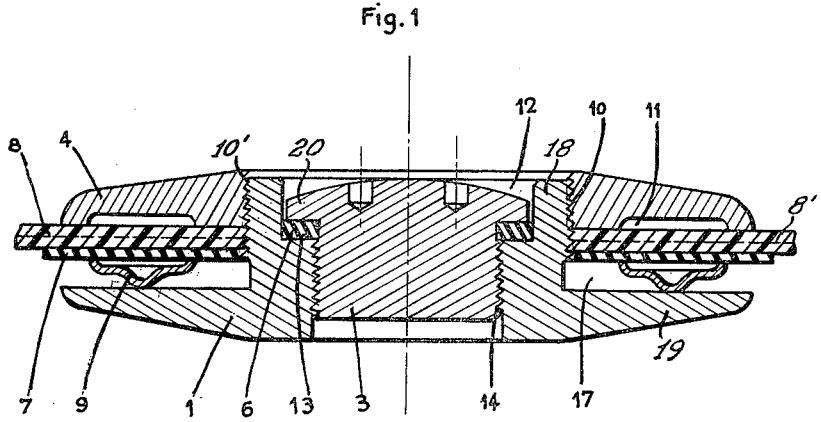
FIGURE 1 is a sectional view of the device according to the invention with its obturating stopper.
Figure 2:
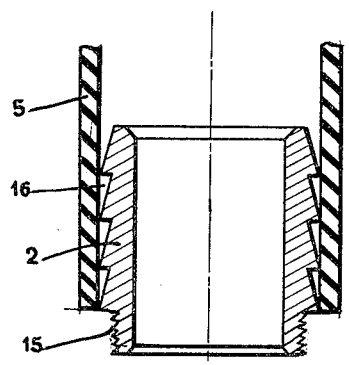
FIGURE 2 is a sectional view of the end of the filling or emptying pipe with its nozzle adapted to fit in a fluid-tight manner on the device shown in FIGURE 1.

As shown in FIGURE 1, the device consists principally of two annular side-pieces 1 and 4 preferably of light metal, for example duraluminum, and forming between them when interconnected a deep annular groove 17. The side-piece 1 consists of an annular element 18 having an outer threaded portion 10 which fits inside the opening provided in the wall 8 of the storage container and a flange portion 19 extending outwardly from the element 18 and forming the head for the side piece 1. When the element 18 is inserted in the opening in the wall 8, the flange portion 19 is spaced from the wall 8, so as to allow the placing in the groove 17 of internal sealing parts consisting of a plane washer 7 and a wedging counter-washer 9 which are clamped against the wall 8 by the outer side-piece 4 fastened to the annular element 18 of the side-piece 1, by means of the threaded portion 10 and a corresponding threaded portion 10' on side piece 4. The wall 8 of the flexible container consists generally of an elastomer reinforced by a screen or web 8'; this wall may also comprise an impermeable film made from a material, such as nylon.

The side-piece 4 is cut away at 11 facing the bearing points of the counter-washer 9, which has a V-shaped section with undulating sides in the form of an accolade. The cut-away at 11 is provided to increase the flexibility of the side piece 4 as it bears against the wall 8. Through this arrangement, fluid-tightness of the opening in the container is ensured during storage without risk of tearing of the edges of the wall 8.

The washer 7 is made, for example, of an elastomer material of good mechanical strength and high resistance to the liquid being stored, the metal counter-washer 9 ensuring a constant pressure by resilience.

The filling and emptying orifice 12 formed in the center of the side-piece 1 can be obturated by a stopper 3, which may be of duralumin; prevention of leakage of the liquid being stored is ensured by an annular packing 6 of a material similar to that of the washer 7; this packing 6 is pressed by the head 20 of the stopper 3 against a step 13 in the wall of the opening, the stopper 3 being screwed on to the portion 14 of the orifice of smaller diameter.

For the filling or emptying operations, the stopper 3 and packing 6 are removed and replaced by the pipe 5. This pipe is provided with a nozzle 2 introduced therein with a force fit by its notched part 16. The end of the nozzle 2 thus fits in a fluid-tight manner on the widened portion of the orifice 12 until it comes to bear by its end face on the step 13, whilst the narrow portion 15 of the nozzle threadably fits along the narrowed threaded portion 14 of the orifice 12.

The pipe 5 is naturally made of a material of high mechanical strength and resistant to the liquid to be stored and the nozzle 2 may be of duralumin.

What I claim is:

1. A fluid-tight safety device for filling, storing and emptying flexible containers having an aperture in the wall thereof, comprising a first side piece and a second side piece having relatively wide opposed faces and having the peripheral ends of the wall of the container adjacent the aperture inserted therebetween, said first side piece including an annular element inserted through said aperture and having a flange portion forming underneath the rim of the aperture in the wall of the container the opposed face for said first side piece, a plane washer adjacent the wall of the container arranged between the wall and said opposed face of the first side piece, and a counter washer having a flared open V-shaped cross section with the point of the V resting on said flange portion of said first side piece and the open end of the V extending toward said plane washer, said second side piece being arranged external to the container and being tightened along the external portion of the annular element of said first side to provide a tightening pressure on the rim of said aperture of the container against said plane washer, said annular element forming a passage orifice for the material to be contained in said container, said passage orifice having a stepped surface, an annular sealing ring arranged on a step of the orifice and a threaded stopper for said orifice for sealing said annular ring against the step of said orifice.

2. A fluid-tight safety device according to claim 1, in which the counter washer has an open V-shaped cross section with undulated rims in the form of an accolade.

3. A fluid-tight device as claimed in claim 1, characterised by the feature that the second side-piece comprises on the container wall side a cut-out portion arranged facing the counter-washer and having a width equivalent to that of the latter.

References Cited by the Examiner
UNITED STATES PATENTS

| | | | |
|---|---|---|---|
| 1,366,634 | 1/21 | Clark | 277—188 X |
| 2,079,991 | 5/37 | Farrington | 220—39 X |
| 2,524,592 | 10/50 | Cordes | 220—39 X |

FRANKLIN T. GARRETT, Primary Examiner.
LOUIS J. DEMBO, Examiner.